United States Patent
Shalem

(10) Patent No.: US 12,118,337 B2
(45) Date of Patent: *Oct. 15, 2024

(54) DETERMINISTIC MEMORY ALLOCATION FOR REAL-TIME APPLICATIONS

(71) Applicant: APEX.AI, INC., Palo Alto, CA (US)

(72) Inventor: Misha Shalem, Zichron Yaakov (IL)

(73) Assignee: APEX.AI, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/219,304

(22) Filed: Jul. 7, 2023

(65) Prior Publication Data

US 2023/0350655 A1 Nov. 2, 2023

Related U.S. Application Data

(63) Continuation of application No. 17/516,393, filed on Nov. 1, 2021, now Pat. No. 11,755,298, which is a continuation of application No. 17/317,767, filed on May 11, 2021, now Pat. No. 11,194,556.

(51) Int. Cl.
| | | |
|---|---|---|
| *G06F 8/41* | (2018.01) | |
| *G06F 12/02* | (2006.01) | |
| *G06F 12/06* | (2006.01) | |

(52) U.S. Cl.
CPC ............ *G06F 8/4434* (2013.01); *G06F 8/42* (2013.01); *G06F 8/433* (2013.01); *G06F 8/441* (2013.01); *G06F 12/02* (2013.01); *G06F 12/06* (2013.01); *G06F 2212/1008* (2013.01)

(58) Field of Classification Search
CPC .......... G06F 8/4434; G06F 8/42; G06F 8/433; G06F 8/41; G06F 8/441; G06F 12/02; G06F 12/06; G06F 2212/1008

USPC ......................................................... 717/145
See application file for complete search history.

(56) References Cited

U.S. PATENT DOCUMENTS

| | | | |
|---|---|---|---|
| 5,491,808 A | * | 2/1996 | Geist, Jr. ............... G06F 12/023 |
| | | | 711/100 |
| 5,893,086 A | | 4/1999 | Schmuck et al. |
| 6,253,226 B1 | | 6/2001 | Chidambaran et al. |
| 6,327,606 B1 | | 12/2001 | Chidambaran |

(Continued)

FOREIGN PATENT DOCUMENTS

JP      2006155516 A      6/2006

OTHER PUBLICATIONS

Notice of Decision to Grant for Japanese Application No. 2022-077352 dated Aug. 9, 2022 in 3 pages.

(Continued)

*Primary Examiner* — Jason D Mitchell

(74) *Attorney, Agent, or Firm* — Procopio, Cory, Hargreaves & Savitch LLP

(57) ABSTRACT

Deterministic memory allocation for real-time applications. In an embodiment, bitcode is scanned to detect calls by a memory allocation function to a dummy function. Each call uses parameters comprising an identifier of a memory pool and a size of a data type to be stored in the memory pool. For each detected call, an allocation record, comprising the parameters, is generated. Then, a header file is generated based on the allocation records. The header file may comprise a definition of bucket(s) and a definition of memory pools. Each definition of a memory pool may identify at least one bucket.

15 Claims, 19 Drawing Sheets

(56) References Cited

U.S. PATENT DOCUMENTS

| | | | |
|---|---|---|---|
| 9,684,492 B2 | 6/2017 | Cawley | |
| 2001/0047510 A1 | 11/2001 | Angel et al. | |
| 2003/0204698 A1 | 10/2003 | Sachedina et al. | |
| 2004/0093344 A1 | 5/2004 | Berger et al. | |
| 2005/0120162 A1 | 6/2005 | Sivaram | |
| 2008/0134158 A1 | 6/2008 | Salz et al. | |
| 2009/0106741 A1 | 4/2009 | Dageville et al. | |
| 2009/0316796 A1 | 12/2009 | Taleb et al. | |
| 2011/0179347 A1 | 7/2011 | Proctor et al. | |
| 2011/0225391 A1 | 9/2011 | Burroughs et al. | |
| 2012/0324197 A1 | 12/2012 | Spradlin et al. | |
| 2013/0145353 A1 | 6/2013 | Tsai et al. | |
| 2018/0025270 A1 | 1/2018 | John et al. | |
| 2018/0121178 A1 | 5/2018 | Distefano et al. | |
| 2019/0034662 A1 | 1/2019 | Del Giudice et al. | |
| 2019/0347208 A1 | 11/2019 | Thiel et al. | |
| 2021/0081410 A1 | 3/2021 | Chavan et al. | |

OTHER PUBLICATIONS

Schulz et al., "DEMO: Using NexMon, the C-based WiFi firmware modification framework," ACM ISBN, Jul. 18, 2016, pp. 213-215.
Laki et al., "The Price for Asynchronous Execution of Extern Functions in Programmable Software Data Planes," IEEE, Feb. 24, 2020, pp. 23-28.
Extended European Search Report for European Application No. 22172582.3 dated Oct. 10, 2022 in 10 pages.
Extended European Search Report mailed May 21, 2024 in European Application No. 24154253.9, 9 pages.

\* cited by examiner

```
template<typename T>
class allocator {
   // ...
   template<typename U>
   struct rebind {
        using other = allocator<U>;
   };
   // ...
   using pointer = T*;
   // ...
   pointer allocate(size_type n, const void * hint = 0) {
        // has to allocate n * sizeof(T) bytes
   }
   // ...
};
```

FIG. 2

```
class bucket { public:
   const std::size_t BlockSize;
   const std::size_t BlockCount;

bucket(std::size_t block_size, std::size_t block_count);
   ~bucket();

// Tests if the pointer belongs to this bucket
   bool belongs(void * ptr) const noexcept;

// Returns nullptr if failed
   [[nodiscard]] void * allocate(std::size_t bytes) noexcept;
   void deallocate(void * ptr, std::size_t bytes) noexcept;

private:
   // Finds n free contiguous blocks in the ledger and returns the first
   // block's index or BlockCount on failure
   std::size_t find_contiguous_blocks(std::size_t n) const noexcept;

// Marks n blocks in the ledger as "in-use" starting at 'index'
   void set_blocks_in_use(std::size_t index, std::size_t n) noexcept;

// Marks n blocks in the ledger as "free" starting at 'index'
   void set_blocks_free(std::size_t index, std::size_t n) noexcept;

// Actual memory for allocations
   std::byte* m_data{nullptr};

// Reserves one bit per block to indicate whether it is in-use
   std::byte* m_ledger{nullptr};
};
```

FIG. 3

```
bucket::bucket(std::size_t block_size, std::size_t block_count)
   : BlockSize{block_size}
   , BlockCount{block_count}
{
   const auto data_size = BlockSize * BlockCount;
   m_data = static_cast<std::byte*>(std::malloc(data_size));
   assert(m_data != nullptr);
   const auto ledger_size = 1 + ((BlockCount - 1) / 8);
   m_ledger = static_cast<std::byte*>(std::malloc(ledger_size));
   assert(m_ledger != nullptr);
   std::memset(m_data, 0, data_size);
   std::memset(m_ledger, 0, ledger_size);
} bucket::~bucket() {
   std::free(m_ledger);
   std::free(m_data);
}
```

FIG. 4

```
void * bucket::allocate(std::size_t bytes) noexcept {
  // Calculate the required number of blocks
  const auto n = 1 + ((bytes - 1) / BlockSize);

const auto index = find_contiguous_blocks(n);
  if(index == BlockCount) {
       return nullptr;
  }

// Update the ledger
  set_blocks_in_use(index, n);

return m_data + (index * BlockSize);
}
```

FIG. 5

```
void * bucket::deallocate(void * ptr, std::size_t bytes) noexcept {
  const auto p = static_cast<const std::byte *>(ptr);
  const std::size_t dist = static_cast<std::size_t>(p - m_data);

// Calculate the block index from pointer distance
  const auto index = dist / BlockSize;

// Calculate the required number of blocks
  const auto n = 1 + ((bytes - 1) / BlockSize);

// Update the ledger
  set_blocks_free(index, n);
}
```

FIG. 6

```
// The default implementation defines a pool with no buckets
template<std::size_t id>
struct bucket_descriptors {
    using type = std::tuple<>;
};
```

FIG. 7

```
struct bucket_cfg16 {
    static constexpr std::size_t BlockSize = 16;
    static constexpr std::size_t BlockCount = 10000;
};

struct bucket_cfg32 {
    static constexpr std::size_t BlockSize = 32;
    static constexpr std::size_t BlockCount = 10000;
};

struct bucket_cfg1024 {
    static constexpr std::size_t BlockSize = 1024;
    static constexpr std::size_t BlockCount = 50000;
};

template<>
struct bucket_descriptors<1> {
    using type = std::tuple<bucket_cfg16, bucket_cfg32, bucket_cfg1024>;
};
```

FIG. 8

```
template<std::size_t id>
using bucket_descriptors_t = typename bucket_descriptors<id>::type;

template<std::size_t id>
static constexpr std::size_t bucket_count =
    std::tuple_size<bucket_descriptors_t<id>>::value;

template<std::size_t id>
using pool_type = std::array<bucket, bucket_count<id>>;

template<std::size_t id, std::size_t Idx>
struct get_size
  : std::integral_constant<std::size_t,
    std::tuple_element_t<Idx, bucket_descriptors_t<id>>::BlockSize>{};

template<std::size_t id, std::size_t Idx>
struct get_count
  : std::integral_constant<std::size_t,
    std::tuple_element_t<Idx, bucket_descriptors_t<id>>::BlockCount>{};
```

FIG. 9

```
template<std::size_t id, std::size_t... Idx>
auto & get_instance(std::index_sequence<Idx...>) noexcept {
    static pool_type<id> instance{{{get_size<id, Idx>::value,
         get_count<id, Idx>::value} ...}};
    return instance;
} template<std::size_t id>
auto & get_instance() noexcept {
    return get_instance<id>(std::make_index_sequence<bucket_count<id>>());
}
```

FIG. 10

```
template<size_t id> // Is there a specialization for this id?
constexpr bool is_defined() noexcept {
   return bucket_count<id> != 0;
} template<size_t id>
bool initialize() noexcept {
   (void) get_instance<id>();
   return is_defined<id>();
}
```

FIG. 11

```
// Assuming buckets are sorted by their block sizes
template<std::size_t id>
[[nodiscard]] void * allocate(std::size_t bytes) {
  auto & pool = get_instance<id>();

for(auto & bucket : pool) {
      if(bucket.BlockSize >= bytes) {
          if(auto ptr = bucket.allocate(bytes); ptr != nullptr) {
              return ptr;
          }
      }
  } throw std::bad_alloc{};
}
```

FIG. 12

```
struct info {
  // Which bucket?
  std::size_t index{0};

// How many blocks would the allocation take from the bucket?
  std::size_t block_count{0};

// How much memory would be wasted?
  std::size_t waste{0};

bool operator<(const info & other) const noexcept {
      return (waste == other.waste)
          ? block_count < other.block_count : waste < other.waste;
  }
};
```

FIG. 13

```
template<std::size_t id>
[[nodiscard]] void * allocate(std::size_t bytes) {
    auto & pool = get_instance<id>();
    std::array<info, bucket_count<id>> deltas;
    for(const auto & bucket : pool) {
        deltas[index].index = index;
        if(bucket.BlockSize >= bytes) {
            deltas[index].waste = bucket.BlockSize - bytes;
            deltas[index].block_count = 1;
        } else {
            const auto n = 1 + ((bytes - 1) / bucket.BlockSize);
            const auto storage_required = n * bucket.BlockSize;
            deltas[index].waste = storage_required - bytes;
            deltas[index].block_count = n;
        }
        ++index;
    }

// std::sort() is not used, since it is allowed to allocate
    sort(deltas.begin(), deltas.end());

for(const auto & d : deltas)
        if(auto ptr = pool[d.index].allocate(bytes); ptr != nullptr)
            return ptr;

throw std::bad_alloc();
}
```

FIG. 14

```
template<std::size_t id>
void deallocate(void * ptr, std::size_t bytes) noexcept {
   auto & pool = get_instance<id>();

for(auto & bucket : pool) {
        if(bucket.belongs(ptr)) {
             bucket.deallocate(ptr, bytes);
             return;
        }
   }
}
```

FIG. 15

```
static constexpr auto AllocId = 1;
using list = std::list<int, static_pool_allocator<int, AllocId>>;
using vector = std::vector<list, static_pool_allocator<list, AllocId>>;

// Both vector and list allocate from the pool with id 1
vector v;
v.emplace_back(5u, 42); // vector is {{42, 42, 42, 42, 42}}
```

FIG. 16

```
static constexpr auto ListAllocId = 1;
static constexpr auto VectorAllocId = 2;
using list = std::list<int, static_pool_allocator<int, ListAllocId>>;
using list_allocator = typename list::allocator_type;
using vector_allocator = static_pool_allocator<list, VectorAllocId>;
using scoped_adapter =
    std::scoped_allocator_adaptor<vector_allocator, list_allocator>;
using vector = std::vector<list, scoped_adapter>;

// List and vector allocate from different memory pools (1 and 2,
// respectively)
vector v;
v.emplace_back(5u, 42); // vector is {{42, 42, 42, 42, 42}}
```

FIG. 17

```
template<typename T = std::uint8_t, std::size_t id = 0>
class static_pool_allocator { public:
  template<typename U>
  struct rebind { using other = static_pool_allocator<U, id>; };

static_pool_allocator() noexcept :
        m_upstream_resource{pmr::get_default_resource()} {}
  static_pool_allocator(pmr::memory_resource * res) noexcept :
        m_upstream_resource{res} {} template<typename U>
  static_pool_allocator(const static_pool_allocator<U, id> & other) noexcept
        : m_upstream_resource{other.upstream_resource()} {} template<typename U>
  static_pool_allocator & operator=(const static_pool_allocator<U, id> &
        other) noexcept {
        m_upstream_resource = other.upstream_resource();
        return *this;
  } static bool initialize_memory_pool() noexcept {
        return memory_pool::initialize<id>();
  } private:
  pmr::memory_resource * m_upstream_resource;
};
```

FIG. 18

```
pointer allocate(size_type n, const void * = 0)
   // Reminder: here T is the type actually being allocated for
   if constexpr (memory_pool::is_defined<id>()) {
        return static_cast<T*>(memory_pool::allocate<id>(sizeof(T) * n));
   } else if(m_uptream_resource != nullptr) {
        return static_cast<T*>(m_upstream_resource->
            allocate(sizeof(T) * n, alignof(T)));
   } else {
        throw std::bad_alloc{};
   }
}
```

FIG. 19

```
namespace instrument {
    template<std::size_t id, typename T, std::size_t size>
    void type_reg() {}
}
```

FIG. 20

```
pointer allocate(size_type n, const void * = 0) { instrument::type_reg<id, T, sizeof(T)>();

if constexpr (memory_pool::is_defined<id>()) {
        return static_cast<T*>(memory_pool::allocate<id>(sizeof(T) * n));
    } else if(m_uptream_resource != nullptr) {
        return static_cast<T*>(m_upstream_resource->
                allocate(sizeof(T) * n, alignof(T)));
    } else {
        throw std::bad_alloc{};
    }
}
```

FIG. 21

```
void deallocate(T * ptr, size_type n) {
    if constexpr (memory_pool::is_defined<id>()) {
        memory_pool::deallocate<id>(ptr, sizeof(T) * n);
    } else if(m_uptream_resource != nullptr) {
        m_upstream_resource->deallocate(ptr, sizeof(T) * n, alignof(T));
    } else {
        assert(false);
    }
}
```

FIG. 22

```
class AllocListPass : public llvm::FunctionPass {
public:
    static char ID;
    AllocListPass() : llvm::FunctionPass(ID) {} bool runOnFunction(llvm::Function & f) override {
        const auto pretty_name =
            boost::core::demangle(f.getName().str().c_str());
        static const std::regex call_regex{
            R"(void instrument::type_reg<([^,]+),(.+),([^,]+)>\(\))"
        };

std::smatch match;
        if(std::regex_match(pretty_name, match, call_regex)) {
            if(match.size() == 4) {
                const auto pool_id = std::atoi(match[1].str().c_str());
                const auto type = match[2].str();
                const auto size = std::atoi(match[3].str().c_str());
                std::cout << "Pool ID: " << pool_id << ", Size: " <<
                    size << ", Type: " << type << "\n";
            }
        }
        return false; // Does not alter the code, a read-only pass
    }
};

char AllocListPass::ID = 0;
static llvm::RegisterPass<AllocListPass>
    dummy("alloc-list", "This pass lists memory pool allocations");
```

FIG. 23

```
0       // file: /home/program.cpp
1       int main() {
2               f();
3               return 0;
4       }
5
6       void f() {
7               x();
8       }
9
10      void x() {
11              std::list<int, static_pool_allocator<int, 3>> lst;
12              lst.push_back(1);
13              // ...
14      }
```

```
Call graph for: Pool ID: 3, Size: 24, Type: std::__1::__list_node<int,
void*>:

1. static_pool_allocator<std::__1::__list_node<int, void*>,
3ul>::allocate(unsigned long, void const*) called at /usr/include/c++/v1/
memory:1547

2.
std::__1::allocator_traits<static_pool_allocator<std::__1::__list_node<int,
void*>, 3ul>>::allocate(static_pool_allocator<std::__1::__list_node<int,
void*>, 3ul>&, unsigned long) called at /usr/include/c++/v1/list:1079

3. std::__1::list<int, static_pool_allocator<int,
3ul>>::__allocate_node(static_pool_allocator<std::__1::__list_node<int,
void*>, 3ul>&) called at /usr/include/c++/v1/list:1569

4. std::__1::list<int, static_pool_allocator<int, 3ul>>::push_back(int
const&) called at /home/program.cpp:12

5. x() called at /home/program.cpp:7

6. f() called at /home/program.cpp:2
```

```
// file: my_defs.hpp
struct bucket_cfg24 {
    static constexpr std::size_t BlockSize = 24;
    static constexpr std::size_t BlockCount = 10000;
};

/* More buckets for memory pool 3 */ template<>
struct bucket_descriptors<3> {
    using type = std::tuple</*more buckets*/ bucket_cfg24 /*more buckets*/>;
};

/* Other buckets and memory pool specializations */
```

FIG. 26

DETERMINISTIC MEMORY ALLOCATION FOR REAL-TIME APPLICATIONS

CROSS-REFERENCE TO RELATED APPLICATIONS

The present application is a continuation of U.S. patent application Ser. No. 17/516,393, filed on Nov. 1, 2021, which is a continuation of U.S. patent application Ser. No. 17/317,767, filed on May 11, 2021, which are both hereby incorporated herein by reference as if set forth in full.

BACKGROUND

Field of the Invention

The embodiments described herein are generally directed to real-time applications, and, more particularly, to deterministic memory allocation in real-time, safety-critical applications (e.g., autonomous mobility of vehicles and robots).

Description of the Related Art

Memory allocation in a real-time, safety-critical environment should be safe and certifiable. For example, with respect to the C++ programming language, memory allocation should comply with the Autosar C++ 14 Coding Guidelines, which satisfy requirements stemming from the International Organization for Standardization (ISO) 26262 standard for functional safety in road vehicles. In particular, memory allocation should comply with two main rules of the Autosar C++ 14 Coding Guidelines.

Firstly, according to Rule A18-5-5, memory management functions should ensure deterministic behavior with worst-case scenario execution time, avoid memory fragmentation, avoid running out of memory, avoid mismatched allocations and deallocations, and not depend on non-deterministic calls to the kernel. The avoidance of running out of memory and mismatched allocations and deallocations cannot be ensured in middleware. However, the other three requirements can be addressed by middleware.

Secondly, according to Rule A18-5-7, if dynamic memory management functions are used, memory can only be allocated and deallocated during non-real-time program phases. In other words, memory can be pre-allocated during initialization, but not during runtime.

SUMMARY

Accordingly, systems, methods, and non-transitory computer-readable media are disclosed for deterministic memory allocation in real-time applications. In an embodiment, a method is disclosed that comprises using at least one hardware processor to: scan bitcode representing compiled source code of an application, wherein the source code comprises an allocation function for allocating memory that calls a dummy function using a plurality of parameters, wherein the plurality of parameters comprises an identifier of a memory pool and a size of a data type to be stored in the memory pool; while scanning the bitcode, detect each call to the dummy function in the bitcode; for each detected call to the dummy function, extract the plurality of parameters used in the detected call to the dummy function, and generate an allocation record comprising the identifier of the memory pool and the size of the data type from the extracted plurality of parameters; generate a list of allocation records from the generated allocation records; and generate a header file based on the list of allocation records, wherein the header file comprises a definition of one or more buckets and a definition of each of one or more memory pools, wherein the definition of each of the one or more memory pools identifies at least one of the one or more buckets. The method may further comprise using the at least one hardware processor to: prior to scanning the bitcode, compile the source code into the bitcode; and, after generating the header file, recompile the source code with the header file.

The definition of each of the one or more buckets may comprise a block count and a block size. Generating the header file may comprise, for each unique size in the list of allocation records, generating at least one definition of a bucket comprising a block size that is aligned with that unique size. Generating the header file may further comprise, for each unique identifier in the list of allocation records, generating a definition of a memory pool having that identifier. Each definition of a memory pool may comprise, for each unique size associated with the identifier of that memory pool in the list of allocation records, a reference to a definition of one of the one or more buckets whose block size is aligned with that size. Generating at least one definition of a bucket may comprise a block size that is aligned with that size comprises generating a definition of a bucket comprising a block size that matches that size.

The definition of each of the one or more memory pools may comprise a tuple, wherein the tuple comprises one or more references, and wherein each of the one or more references identifies one of the one or more buckets.

In the bitcode, each instance of the allocation function may be bound to a single memory pool, such that the allocation function cannot allocate from any memory pool other than the single memory pool.

The allocation function may be configured to: while the memory pool is undefined, allocate memory from an upstream resource available to the application; and, while the memory pool is defined, allocate memory from the memory pool.

The source code may be written in C++ programming language. The allocation function may be a custom allocator according to an allocator model of the C++ programming language.

The method may further comprise using the at least one hardware processor to, for each of the one or more allocations, generate a call graph representing a path of function calls from an entry point of the application to the allocation function.

The plurality of parameters may further comprise an identifier of the data type to be stored in the memory pool.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 illustrates example source code for an allocator template, according to an embodiment;

FIG. 3 illustrates source code for an example implementation of a bucket in a memory pool, according to an embodiment;

FIG. 4 illustrates source code for an example implementation of the constructor and destructor functions for a bucket, according to an embodiment;

FIG. 5 illustrates source code for an example implementation of the allocation function for allocating blocks in a bucket, according to an embodiment;

FIG. 6 illustrates source code for an example implementation of the deallocation function for deallocating blocks in a bucket, according to an embodiment;

FIG. 7 illustrates source code for an example implementation of a template structure for defining a memory pool, according to an embodiment;

FIG. 8 illustrates source code for an example implementation that specializes the template structure for defining a memory pool for a particular example application, according to an embodiment;

FIG. 9 illustrates source code for an example implementation of some structures that define traits of memory pools, according to an embodiment;

FIG. 10 illustrates source code for an example implementation of the function for creating a memory pool, according to an embodiment;

FIG. 11 illustrates source code for an example implementation of memory-pool initialization, according to an embodiment;

FIG. 12 illustrates source code for an example implementation of an allocation function that utilizes a first-fit strategy, according to an embodiment;

FIG. 13 illustrates source code for an example implementation of an info structure to help in the selection of a bucket, according to an embodiment;

FIG. 14 illustrates source code for an example implementation of an allocation function for allocating buckets in a memory pool, according to an embodiment;

FIG. 15 illustrates source code for an example implementation of a deallocation function for deallocating buckets in a memory pool, according to an embodiment;

FIG. 16 illustrates an example usage scenario in which the same memory pool is used for nested data objects, according to an embodiment;

FIG. 17 illustrates an example usage scenario in which separate memory pools are used for nested data objects, according to an embodiment;

FIG. 18 illustrates source code for an example implementation of a static pool allocator, according to an embodiment;

FIG. 19 illustrates source code for an example implementation of an allocation function of a static pool allocator, according to an embodiment;

FIG. 20 illustrates source code for an example implementation of an instrument namespace that defines a dummy function, according to an embodiment;

FIG. 21 illustrates source code for an example implementation of the injection of instrument code injected into an allocation function of a static pool allocator, according to an embodiment;

FIG. 22 illustrates source code for an example implementation of a deallocation function of a static pool allocator, according to an embodiment;

FIG. 23 illustrates source code for an example implementation of a pass to analyze bitcode, according to an embodiment;

FIG. 24 illustrates source code for a simple application that uses an embodiment of a static pool allocator;

FIG. 25 illustrates a call graph for an allocation, produced by a pass on a simple application, according to an embodiment;

FIG. 26 illustrates an example header file, according to an embodiment; and

DETAILED DESCRIPTION

In an embodiment, systems, methods, and non-transitory computer-readable media are disclosed for deterministic memory allocation for use, for example, in real-time and/or safety-critical applications. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Figure 1:
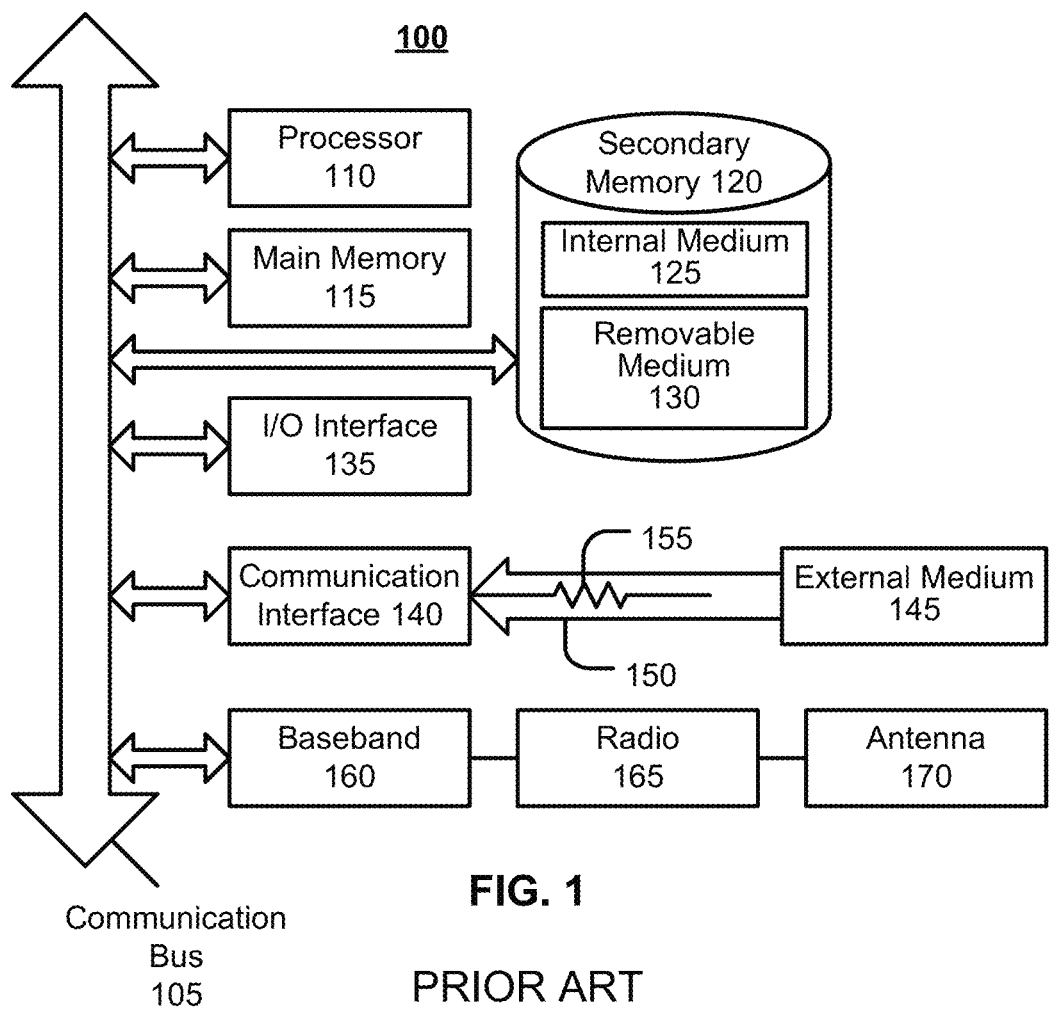
FIG. 1 illustrates an example processing system, by which one or more of the processes described herein may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods (e.g., to store and/or execute one or more software modules, such as the optimizer tool) described herein. System 100 can be a server or any conventional personal computer, or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., disclosed software modules) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server (e.g., platform 110) via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, comprising one or more software modules) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network. The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor 110, which may be a central processing unit (CPU). Processor 110 has access to data storage areas 115 and 120. Processor 110 is preferably configured to execute instructions (i.e., computer programs, such as the disclosed software) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for deterministic memory allocation will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processors 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction to Memory Pools

In fixed-size block allocation, memory pools are used for memory management. Memory pools enable dynamic memory allocation by pre-allocating a number of memory blocks with the same block size into a bucket. In other words, a bucket is defined by a block count and a block size. The size of a bucket is the product of the block count and block size.

A memory pool can comprise one or a plurality of buckets. In the event that the memory pool comprises a plurality of buckets, a given bucket may have differently sized memory blocks than one or more other buckets and/or may have a different number of memory blocks than one or more other buckets. In other words, the memory pool can comprise a plurality of buckets, and the block count and block size of each bucket may be independently configured. Each bucket in a memory pool may have the same, fixed size as every other bucket. However, each bucket may be divided into a different number of blocks. As a simple example, a memory pool may have four buckets that are each 65,536 bytes (i.e., 64 kilobytes (kb)) in size. A first one of the buckets may have 8,196 blocks that are all 8 bytes in size; a second one of the buckets may have 1,024 blocks that are all 64 bytes in size; a third one of the buckets may have 64 blocks that are all 1,024 bytes (1 kb) in size; and a fourth one of the buckets may have 16 blocks that are all 4,096 bytes (4 kb) in size. Alternatively, two or more buckets in a memory pool may have different sizes. While a memory pool will be primarily discussed herein as a collection of a plurality of buckets, it should be understood that the disclosed embodiments can be applied, without any modification, to a memory pool consisting of a single bucket.

While the size of a memory pool is fixed at compile-time (i.e., the time at which the application is compiled), an application can allocate, access, and deallocate memory blocks in a given bucket of the memory pool during runtime (e.g., in a real-time program phase). Importantly, memory pools provide dynamic allocations and deallocations in a pre-allocated buffer of memory that can all be performed in constant time. Thus, memory pools are deterministic, and therefore, suitable for real-time, safety-critical applications, since the constant time ensures a worst-case time for any allocation or deallocation operation.

Typically, the dimensions of the buckets (i.e., block size and block count) in the memory pool need to be known in advance at compile-time. However, the block count that will be needed by an application may depend on the runtime (e.g., an input that is not known at compile-time), and therefore, may not be known at compile-time. Thus, in real-time and embedded applications, a maximum limit of the block count is hard-coded into the application. In contrast, for any programming language that has discrete data types, the block size that will be needed by the application should be known at compile-time.

2.2. Introduction to Allocators

Programming languages, such as C++, utilize high-level abstractions that hide the real sizes of allocations. For example, the C++ Standard Library (std) provides several containers, such as a map (std::map), list (std::list), set (std::set), promise (std::promise), and shared pointer (std::sharedptr). These containers utilize allocators for allocation and deallocation of memory. In other words, an allocator handles all requests for allocation and deallocation of memory for a given container.

While the Standard Library provides general-purpose allocators that are used by default, the containers are capable of accepting and using a custom, developer-implemented allocator as a parameter. However, the actual allocation and deallocation by an allocator is done internally within the implementation of the Standard Library. Thus, calls to a custom allocator do not typically appear in the software code. This means that block sizes for buckets used by custom allocators cannot typically be derived from the software code at compile-time.

The template of an allocator comprises a rebind structure that instantiates a new allocator with another data type used internally by the container. FIG. 2 illustrates example source code for the template of an allocator, with the rebind structure, according to an embodiment. As illustrated, the rebind structure creates a new instantiation of the same allocator, which may be a customer allocator to be used for a first data type (e.g., typename T in FIG. 2), for a second data type (e.g., typename U in FIG. 2) needed internally by the container. For example, the std::list container may get a custom allocator for a given data type, but will need to allocate memory for nodes, as well as the given data type. To this end, the rebind structure will rebind the custom allocator with the internal list node data type used by the std::list container. Thus, hidden in the rebind structure, is a place in the software code at which the necessary data size for a custom allocator should be derivable.

2.3. Implementation of Memory Pool

An example implementation of a memory pool that can be used in disclosed embodiments will now be described. Only a minimal implementation will be illustrated, since a complete description is not necessary to an understanding of the disclosed embodiments. Thus, some error checks are skipped for better readability, the described implementation is not thread-safe, and default alignment is assumed. Other implementations may include more robust error checking, be thread-safe, and/or not assume default alignment. It should be understood that the particular implementation to be used may depend on the particular application for which the memory pool is being used.

In an embodiment, multiple instances of a memory pool can be defined in the same application. This can be important, since safety-critical applications often require the separation of memory pools for safety. For example, in an application with a plurality of threads, a separate memory pool may be instantiated for each thread to prevent the threads from locking each other.

FIG. 3 illustrates source code for an example implementation of a bucket in the memory pool, according to an embodiment. Each bucket has a constant block size (BlockSize) and a constant block count (BlockCount), which are both defined by the parameters passed to its bucket( ) constructor. Each bucket also comprises a pointer (m_data) to the actual memory to be allocated within the bucket, and a pointer (m_ledger) to a ledger, which may comprise a bitmap that keeps track of memory allocations using one bit for each block in the bucket. The index of each block in the bucket corresponds to the index of each bit in the bitmap. When a block is allocated, the bit in the bitmap corresponding to the index of that block can be set to '1', and when a block is deallocated, the bit in the bitmap corresponding to the index of that block can be set to '0'.

In addition, the example bucket implementation comprises the following functions:

The public belong( ) function tests whether or not the memory pointer passed as the parameter belongs to the bucket.

The public allocate( ) and deallocate( ) functions allocate and deallocate memory blocks in the bucket, respectively.

The private find_contiguous_blocks( ) function receives a number "n" as a parameter and attempts to find a set of "n" contiguous blocks. For example, the function may scan the bitmap of the ledger to find a sequence of "n" contiguous "0"s in the bitmap, representing a set of "n" contiguous free blocks. If the function finds a set of "n" contiguous free blocks, the function returns the index to the first block in the set of "n" contiguous free blocks. If the function does not find a set of "n" contiguous free blocks, the function returns BlockCount.

The private set_blocks_in_use( ) function receives an index and a number "n", and marks the set of "n" blocks that start at the index as allocated or "in-use". For example, the function may set a sequence of "n" bits in the bitmap of the ledger, starting at the index, to "1".

The private set_blocks_free( ) function receives an index and a number "n", and marks the set of "n" blocks that start at the index as deallocated or "free". For example, the function may set a sequence of "n" bits in the bitmap of the ledger, starting at the index, to "0".

FIG. 4 illustrates source code for an example implementation of the constructor and destructor for a bucket, according to an embodiment. As illustrated, the constructor utilizes std::malloc to allocate memory equal to the size of the bucket (i.e., BlockSize*BlockCount) for the data in the bucket, and to allocate memory equal to the block count (i.e., BlockCount) for the ledger. Notably, instead of std::malloc, the "new" operator of the C++ programming language may be used. In either case, the constructor initializes the allocated memory for the data and the ledger to zero. If a custom alignment is needed, as opposed to the assumed default alignment, it can be implemented in the constructor for the bucket (e.g., by replacing std::malloc with a function that can provide a custom alignment).

FIG. 5 illustrates source code for an example implementation of the allocate( ) function for allocating blocks in a bucket, according to an embodiment. As illustrated, the allocate( ) function receives the number of bytes to be allocated as an input parameter, and converts it into a number "n" of blocks by dividing the number of bytes by the block size and rounding up if necessary. The allocate( ) function then calls the find_contiguous_blocks( ) function to determine if there is a set of "n" contiguous free blocks. If there is not a set of "n" contiguous free blocks, the allocate( ) function returns null. If there is a set of "n" contiguous free blocks, the allocate( ) function calls the set_blocks_in_use( ) function to mark the blocks as allocated and returns a pointer to the first block in this set of "n" contiguous now-allocated blocks in the bucket.

FIG. 6 illustrates source code for an example implementation of the deallocate( ) function for deallocating blocks in a bucket, according to an embodiment. As illustrated, the deallocate( ) function receives a pointer and the number of bytes to be deallocated as input parameters. The deallocate( ) function calculates the distance between the start of the data of the bucket and the pointer, and calculates the index of the first block to be deallocated based on this pointer distance. Then, the deallocate( ) function calculates the number of blocks to be deallocated based on the number of bytes received as an input parameter, and calls the set_blocks_free( ) function to mark the calculated number of blocks, starting with the calculated index of the first block, as deallocated.

As discussed above, a memory pool is simply a collection of one or more, and in many instances a plurality of, buckets. Each bucket has two properties: a block size; and a block count. A collection of this pair of properties for one or more buckets defines an instance of the memory pool. FIG. 7 illustrates source code for an example implementation of a template structure for defining a memory pool, according to an embodiment. The "id" parameter identifies the instance of the memory pool. The identifier may be an integer (e.g., "1" for a first instance of a memory pool, "2" for a second instance of the memory pool, etc.) or some other data type (e.g., a character string). The default implementation defines a memory pool with no buckets (i.e., an empty tuple).

FIG. 8 illustrates source code for an example implementation that specializes the template structure for defining a memory pool to a particular example application, according to an embodiment. This source code may be provided in a header file used to compile an application. The template structure defines a memory pool with an identifier of "1", consisting of three buckets having three different configurations. The first bucket has a block size of 16 bytes and a block count of 10000, the second bucket has a block size of 32 bytes and a block count of 10000, and the third bucket has a block size of 1024 bytes and a block count of 50000. It should be understood that this is just one example, and the exact number and configuration of buckets in the memory pool will depend on the application that is to use the memory pool. The important point is that the file, defining the memory pool(s), can be generated and/or modified to customize the memory pool(s) to a particular application.

FIG. 9 illustrates source code for an example implementation of some structures that define traits of the memory pools, according to an embodiment. The bucket count trait (bucket_count) represents the size of the tuple (i.e., number of buckets) in the memory pool. The pool type trait (pool_type) is an array of buckets with a size equal to the bucket_count. The get size (get_size) and get count (get_count) functions return the block size and block count properties, respectively, of the bucket identified by the identifier of the memory pool (id) and the index of the bucket (Idx) within the tuple of that memory pool.

FIG. 10 illustrates source code for an example implementation of the function for creating a memory pool, according to an embodiment. As illustrated, the get_instance( ) function is instantiated with the identifier of a memory pool, to define a static local array (pool_type). The get_instance( ) function will call the get_size( ) and get_count( ) functions for every bucket in the tuple of the memory pool to instantiate the array with actual buckets, thereby creating the memory pool.

FIG. 11 illustrates source code for an example implementation of memory-pool initialization, according to an embodiment. As illustrated, the is_defined( ) function returns a Boolean indicating whether or not the memory pool with the specified identifier comprises at least one bucket (true) or has no buckets (false). The initialize( ) function is a helper function for instantiating a memory pool. These two functions are helpful, because, as mentioned above, a default memory pool may be instantiated with no buckets.

2.4. Selection of a Bucket

When allocation is performed, the allocator does not have information about whether the allocation is for one or multiple data objects. Rather, the allocator only receives the number of bytes of data to be stored. In other words, information about the data objects that are being stored is not available at the allocation level. Thus, the allocator must select the appropriate bucket for a given allocation, based on the number of bytes in the data to be stored, rather than the number of data objects to be stored. This selection can be implemented in a variety of manners.

For example, the application could simply scan through the buckets in a memory pool until it reaches a bucket that is sufficiently sized to fit the data to be stored. In this case, the buckets should be sorted by their block sizes. FIG. 12 illustrates source code for an example implementation of the allocate( ) function that utilizes this first-fit strategy, according to an embodiment. As illustrated, the allocate( ) function iterates through the buckets until it finds a bucket with a block size that is greater than or equal to the input parameter (bytes) representing the size of the data to be stored. As soon as such a bucket is found, the allocate( ) function allocates the bucket to the data, and returns a pointer to the bucket. Otherwise, if no such bucket is found, the allocate( ) function throws an exception indicating that the allocation failed. This first-fit strategy would be suitable for containers, such as std::map and std::list, which allocate memory for their data objects one by one. However, the first-fit strategy may not be suitable for other containers that allocate memory for multiple types of data objects at the same time (e.g., std::unordered_map, which allocates memory for both hash nodes and pointers to hash nodes).

In a more sophisticated strategy, a compile-time analysis could be performed on the software code of an application. That analysis can then be used to bind particular buckets to particular data types (e.g., based on typename). In other words, particular buckets can be configured to align with particular data types.

As a runtime alternative that would be suitable for all types of containers (e.g., std::map, std::list, std::unordered_map, etc.), the allocate( ) function can select the bucket that results in the least wasted memory and/or the minimum number of allocated blocks. FIG. 13 illustrates source code for an example implementation of an info structure to help in the selection of a bucket, according to an embodiment. As illustrated, the info structure defines an operator that compares two buckets based on their respective amount of waste for an allocation and the number of blocks that would be required for an allocation. In this case, the amount of waste is defined as the difference in bytes between the size of the data to be stored and the total size of the blocks that would be required to store the data. The operator is designed to prioritize the minimization of waste by, if the amount of waste for two buckets is not equal, prioritize the bucket with the minimum amount of waste, and, if the amount of waste for two buckets is equal, prioritize the bucket that would require the minimum number of blocks. Thus, the operator can be used to order a set of buckets by their respective amounts of waste, and select the bucket that results in the least amount of waste.

FIG. 14 illustrates source code for an example implementation of the allocate( ) function for allocating buckets in a memory pool, utilizing the info structure from FIG. 13, according to an embodiment. As illustrated, the allocate( ) function calculates the amount of waste and the required number of blocks for each bucket in the memory pool and stores these values in an array of info structures. Each entry in the array corresponds to exactly one of the buckets. Then, the allocate( ) function sorts the array, based on the operator defined in the info structure, from the bucket with the lowest amount of waste to the bucket with the highest amount of waste. The allocate( ) function can then select the bucket with the lowest amount of waste from this sorted array.

Since the allocator may need to allocate contiguous sets of blocks, there is the possibility of memory fragmentation within the buckets of a memory pool. However, the developer of an application can mitigate memory fragmentation, during development, by being mindful of patterns of allocation and deallocation and by utilizing separate memory pools.

FIG. 15 illustrates source code for an example implementation of the deallocate( ) function for deallocating buckets in a memory pool, according to an embodiment. As illustrated, the deallocate( ) function receives a pointer and a number of bytes as input parameters. The deallocate( ) function checks that the pointer belongs to the bucket, and if so, calls the deallocate( ) function for deallocating blocks in the bucket.

2.5. Implementation of Allocator

The allocator used in disclosed embodiments may implement a C++ allocator model that is compatible with std:: allocator traits. Many constructs in C++ can silently migrate from one allocator to another. This creates the potential for an allocator to move data from one memory pool to another memory pool when moving data between different containers, and this can result in non-deterministic memory allocation. Thus, in an embodiment, each allocator is bound to a single, specific instance of a memory pool at compile-time to ensure that the allocator cannot move data between memory pools.

In an embodiment, each allocator is implemented to allocate from another resource until the memory pool to which it is bound is defined. As discussed above, a memory pool may be instantiated with no buckets (i.e., undefined). Thus, the allocator should be capable of functioning properly even when its memory pool is undefined. Accordingly, the allocator may be configured to allocate from a default resource, such as the memory heap, until the memory pool to which it is bound is defined. Then, once the memory pool is defined, the allocator will automatically begin allocating from the memory pool.

FIG. 16 illustrates an example usage scenario in which the same memory pool is used for nested data objects, according to an embodiment. As illustrated, the static pool allocator (static_pool_allocator) has two template arguments, including the data type and the identifier of the memory pool. In this scenario, a list object and a vector of list objects are allocated from the same memory pool (i.e., the memory pool identified by AllocId=1). When the vector is populated with values, the data for the lists and the data for the vector are stored in the same memory pool.

FIG. 17 illustrates an alternative usage scenario in which separate memory pools are used for nested data objects, according to an embodiment. As illustrated, two different allocators are created from the template static_pool_allocator for the list (i.e., list allocator) and the vector (i.e., vector_allocator). Each allocator is bound to a different memory pool. For example, the list allocator is bound to the memory pool with a first identifier (i.e., AllocId=1), and the vector allocator is bound to the memory pool with a second identifier (i.e., AllocId=2). Consequently, when the vector is populated with values, the data for the lists are stored in a separate memory pool than the data for the vector.

FIG. 18 illustrates source code for an example implementation of the static pool allocator (static_pool_allocator), according to an embodiment. Notably, the illustrated implementation only includes the code that is most relevant to an understanding of the allocation, while omitting code that is irrelevant to an understanding of the allocation. Much of the omitted code is identical to the code in std::pmr::polymorphic allocator.

As illustrated, the rebind structure only rebinds the static pool allocator to the same memory pool. Specifically, the rebind structure uses the same identifier of the memory pool when re-instantiating the static pool allocator. Similarly, the copy constructor and the assignment operator also utilize the same identifier of the memory pool to ensure that the static pool allocator is bound to a single memory pool and prohibited from moving data between different memory pools.

In addition, the static pool allocator defines an upstream resource (m_upstream_resource), which is initialized as the default resource (by calling the pmr::get_default_resource( ) function). Thus, if the identifier of the memory pool is undefined, the static pool allocator is still able to allocate memory. In particular, when the memory pool is undefined, the static pool allocator will allocate memory from the default resource (e.g., the memory heap available to the overarching application).

FIG. 19 illustrates source code for an example implementation of the allocate( ) function of the static pool allocator, according to an embodiment. As illustrated, if the memory pool is defined, the function allocates memory from the memory pool that is bound to the allocator. Otherwise, if the memory pool is not defined, the function allocates memory from the upstream resource. The portion of runtime during which the memory pool is defined can be thought of as a certifiable mode, which is suitable and certified for real-time, safety-critical environments. In contrast, the runtime during which the memory pool is undefined can be thought of as an uncertifiable mode, which is not suitable or certified for real-time, safety-critical environments.

2.6. Collection of Data Type Sizes

Notably, as illustrated in FIG. 19, the data type (T) for which allocation is being performed is known in the allocate( ) function of the static pool allocator (static_pool_allocator::allocate). Thus, the size of the data type can be output by this allocate( ) function during runtime, and the sizes of the data types for which memory is being allocated could be logged during runtime. However, this would not be ideal, since it does not guarantee complete coverage for all data types. For example, data types for which allocation is rare may not end up being logged during a given finite runtime period. Furthermore, even if complete coverage of allocations could be guaranteed for some applications, it would be impossible or impractical for all real-world applications. In addition, the developer generally does not have information about the call graph (e.g., how and why the allocate( ) function was reached during runtime). Thus, it is difficult to prove that all possible data types have been accounted for.

Ideally, all calls to the allocate( ) function of the static pool allocator, instantiated for every data type in the compiled code, would be registered, regardless of the runtime flow (e.g., regardless of whether or not the function is actually called for a particular data type during runtime). It would also be helpful to register all call paths that lead to these allocations. In an embodiment, to enable these registrations, instrumentation code is injected into the source code.

FIG. 20 illustrates source code for an example implementation of an instrument namespace, according to an embodiment. As illustrated, the instrument namespace is defined as a template with three arguments and a dummy function called type_reg( ). The three arguments of the template are the identifier of the memory pool, the name of the data type, and the size of the data type. The type_reg( ) function is a dummy function because it does not perform any substantive action. Rather, the sole purpose of the dummy function is to record the three arguments for each allocation. Thus, it should be understood that the dummy function could have any arbitrary name. In addition, while the dummy function is illustrated as empty, in an alternative embodiment, it could include one or more instructions.

FIG. 21 illustrates source code for an example implementation of the instrument code injected into the allocate( ) function of the static pool allocator illustrated in FIG. 19, according to an embodiment. As illustrated, a call to the instrument:type_reg( ) function has been injected into the allocate( ) function. The call to the dummy type_reg( ) function passes the identifier of the memory pool, the name of the data type, and the size of the data type to the empty type_reg( ) function.

As discussed above, the type_reg( ) function is a dummy function that does not actually affect any operation of the application. The significance of calls to the type_reg( ) function is that they can be detected in the object code produced by compiling the source code of the application. In other words, once the application has been compiled from source code to object code, analysis software can scan the compiled object code to identify each occurrence of a call to the type_reg( ) function. The analysis software can then extract the identifier of the memory pool, the name of the data type, and the size of the data type from the identified snippets of object code, and register each memory pool with the associated data type(s) and the associated size(s) of those data type(s). The analysis software can then determine the appropriate bucket configurations for each memory pool, based on these registrations. Advantageously, this ensures that every data type that may use a memory pool is known, regardless of whether or not memory is allocated from that memory pool to that data type during a finite runtime period.

FIG. 22 illustrates source code for an example implementation of the deallocate( ) function of the static pool allocator, according to an embodiment. As illustrated, if the memory pool is defined, the deallocate( ) function deallocates from the memory pool using the memory pool's deallocate( ) function. Otherwise, if the memory pool is undefined, the deallocate( ) function deallocates from the upstream resource.

2.7. Generation of Bucket Definitions

In an embodiment, to collect bucket definitions according to actual allocations, the source code is firstly compiled into object code. For example, for source code written in C++, the source code may be compiled with the Clang™ compiler into LLVM (formerly an acronym for Low Level Virtual Machine) bitcode, which is an intermediate bitcode that is easy to analyze and manipulate. When compiling the source code, it may be helpful to set the compiler with the following parameters (provided in terms of the Clang™ compiler, but translatable to other compilers):

- -g to have the file:line information for purposes of generating call graphs;
- -O0 to prevent the compiler from performing optimization, since the compiler may remove the injected calls to the dummy function during optimization;
- -emit-llvm to compile the source code into bitcode, instead of native instructions; and/or
- -DNDEBUG to get the release versions of data structures.

Secondly, one or a plurality of passes are implemented over the compiled code to compose a list of all unique data types that are allocated for each instance of each memory pool. In addition, the pass(es) may construct a call graph for every allocation, which can be useful for debugging purposes, as well as providing insights into how the application operates. The pass(es) may be implemented using the LLVM opt tool on the LLVM bitcode produced by the Clang™ compiler. The LLVM opt tool enables a custom pass to be performed on an LLVM bitcode file. For the sake of efficiency, if the compiler produces a plurality of bitcode files, the plurality of bitcode files may be combined into a single bitcode file, so that each pass is only performed on a single composite bitcode file.

FIG. 23 illustrates source code for an example implementation of a pass, according to an embodiment. The illustrated pass is a function pass that uses a regular expression to extract and parse function calls to the dummy type_reg( ) function, and generates a list of the extracted data. In particular, each row in the list represents one function call to the dummy type_reg( ) function and comprises the identifier of a memory pool, the size of a data type that uses that memory pool, and the name of the data type that uses that memory pool, passed as parameters in the function call to the dummy type_reg( ) function. It should be understood that the list may comprise rows associating one or more data types with one or more memory pools, including potentially, a plurality of data types associated with a single memory pool and/or a single data type associated with a plurality of memory pools.

In practice, lllvm::ModulePass may be used, instead of llvm:FunctionPass, to produce call graphs from the entire software module being analyzed. A depth-first search may be performed, starting from the entry point(s) to the module (e.g., the main( ) function). Each time a call to the type_reg( ) function is discovered, the data type (e.g., size and/or name) of the allocation is registered (e.g., printed or stored in a list as described above), and the call graph for the allocation is registered (e.g., printed or stored in a file). For efficiency, recursions in the call graphs can be detected, and the branches in the call graphs representing those recursions can be dropped since they will not end in an allocation. The result of the pass is a list of all unique allocations. As described above, this list of unique allocations may comprise, for each allocation, an identifier of a memory pool, and the size of a data type allocated from that memory pool and/or the name of that data type. It should be understood that, during the pass(es), the same allocation (i.e., the same combination of memory-pool identifier, data-type size, and data-type name) may be detected multiple times. Thus, to obtain a list of unique allocations, the allocations in the list may be de-duplicated, such that there is only one entry for each unique combination of memory-pool identifier, data-type size, and data-type name.

Thirdly, definitions of the memory pools and definitions of the buckets used by the memory pools are generated from the list of unique allocations generated by the pass(es). For example, the list of unique allocations may be translated into a header file that defines memory pools that are specialized according to their allocations in the list. In other words, each memory pool may be defined in the header file with bucket descriptors that optimize the configuration of the buckets according to the data types in the allocations in the list of unique allocations that comprise the identifier of that memory pool.

FIG. 24 illustrates source code for a simple application that uses an embodiment of the static pool allocator described herein. It should be understood that this application is not a real-world example, and is only being used to demonstrate operation of disclosed embodiments. As illustrated, the application comprises a main( ) function that calls an f( ) function, which calls an x( ) function. The x( ) function instantiates a std::list of integers called "lst" with a static pool allocator that is bound to a memory pool with the identifier "3", and then appends the integer "1" to the list "lst".

FIG. 25 illustrates the call graph produced for an allocation detected by a pass on the simple application illustrated in FIG. 24, according to an embodiment. In particular, the illustrated call graph is for the allocation of the list node triggered by appending the integer "1" to the list "lst". Thus, the call graph is associated with the memory-pool identifier "3", a data-type size of "24" (i.e., the size in bytes of a list node), and a data-type name of "list node". The call graph provides insights into the mechanisms and reasons for each allocation.

Notably, the call graphs generated in this manner may be incomplete, due to the possibility of virtual calls, calls through a function pointer, and inline assembly. However, this problem can be mitigated by combining the call graphs with the list of unique allocations to provably certify that every allocation is covered. This approach is capable of detecting orphaned allocations, which are unreachable allocations that will never be called during runtime (e.g., absent from the call graphs, but present in the list of unique allocations). From a safety standpoint, it is generally better to over-include allocations than under-include allocations.

In an embodiment which utilizes the Clang™ compiler, the analysis software can be run on the bitcode produced by the compiler using the "opt" command. For example, to run a shared object (SO) compiled library file, implementing the analysis pass, on the bitcode for the example application illustrated in FIG. 24, the following command may be used:

opt-load    alloc-analyzer.so-alloc-analyze-gen-hdr my_defs.hpp-entry-point "main"<home/program.bc-o/ dev/null Essentially, this command loads the allocator analyzer tool (alloc_analyzer.so), and generates the header file (my_defs.hpp), starting at the main( ) function in the bitcode file (home/program.bc).

FIG. 26 illustrates the example header file (my_defs.hpp) that is generated based on the pass(es) of the analysis software on the bitcode of the simple application illustrated in FIG. 24, according to an embodiment. As illustrated, the header file comprises a bucket (bucket_cfg24) and bucket descriptors (bucket_descriptors) for the memory pool with the identifier "3". Notably, the generated bucket is optimized for the list nodes used by the list in the example application. In particular, the block size for the bucket is 24 bytes, such that the blocks are precisely aligned with the 24-byte list nodes used in the list. In other words, each node in the list corresponds exactly to one block in the bucket. It should be understood that, in a more complex application, the header file may comprise a plurality of buckets for a plurality of memory pools. In this case, the bucket descriptors may comprise a tuple with a plurality of buckets, rather than a single bucket, and tuples may be defined for a plurality of memory pools, rather than a single memory pool.

Once the header file has been generated, as described above, the application can be recompiled with the newly generated header file that optimally defines each memory pool and each bucket used by each memory pool. Notably, if the application was executed without these definitions, the application will still execute properly, but will utilize the upstream resource (e.g., memory heap), due to the implementation of the static pool allocator described above. Once the application is recompiled with these definitions (i.e., recompiled with the header file), it will utilize the defined memory pools, instead of the upstream resource. In other words, as a result of the described implementation of the static pool allocator, the application is able to seamlessly switch between allocating from a default memory resource and allocating from memory pool(s), without any modification to the application itself.

2.8. Example Embodiment

Advantageously, the embodiments described herein ensure deterministic memory allocations for safety-critical applications. While the use of memory pools with fixed bucket sizes can ensure deterministic behavior, properly configuring these memory pools is complicated, for example, in the context of the C++ allocator model. Accordingly, embodiments inject instrument code into a custom allocator, and then detect the instrument code at compile-time to extract the attributes of each allocation. These attributes may then be used to generate a header file that optimally configures the memory pools. This represents a certifiably deterministic memory-allocation solution for real-time and/or safety-critical applications.

Figure 27:
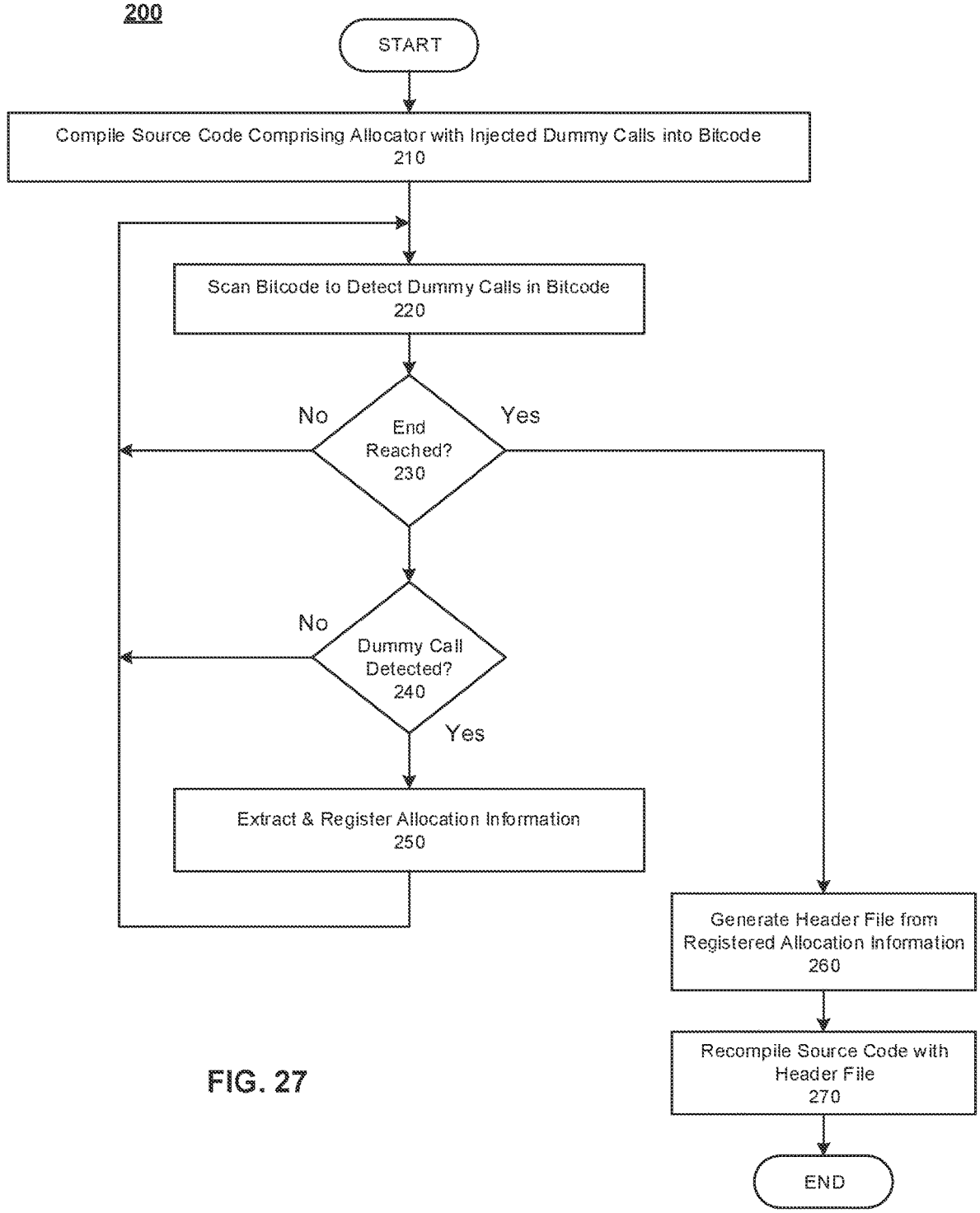
FIG. 27 illustrates an example process for optimizing memory pools used in an application, according to an embodiment.

FIG. 27 illustrates an example overall process 200 for optimizing the memory pools used in an application, according to an embodiment. One or more, and potentially all, of the subprocesses in process 200 may be implemented as one or more software modules of an optimizer tool (e.g., comprising or consisting of the analysis software described herein), which may include or work in conjunction with a compiler. The optimizer tool may be executed by one or more processors 110 of one or more systems 100 to generate a header file at compile-time that optimally defines one or more memory pools used by an application during runtime.

Initially, in subprocess 210, the source code for an application is compiled into bitcode. In order for process 200 to be effective, the source code should utilize an allocator or other allocation function that calls a dummy function, using relevant arguments, during each allocation. For example, the static pool allocator described herein, which calls a dummy function, such as the example type_reg( ) function described herein, may be used as the allocator. The relevant arguments passed in the call to the dummy function may comprise an identifier of the memory pool to which the allocator is bound and one or more attributes of the data type for which memory from the memory pool is being allocated. While embodiments have been described herein primarily with respect to the allocator model in C++, it should be understood that a dummy function may be similarly incorporated into the standard allocation functions and schemes used by other programming languages to achieve the same result.

In subprocess 220, the bitcode is analyzed. In particular, the optimizer tool may scan through the bitcode to identify segments of the bitcode that represent the calls by the allocation function (e.g., custom C++ allocator) to the dummy function. The optimizer tool will scan the bitcode until the end of the bitcode has been reached (i.e., "Yes" in subprocess 230). As long as the end of the bitcode has not yet been reached (i.e., "No" in subprocess 230), the optimizer tool will determine whether the current view of the bitcode represents a call to the dummy function. For example, the optimizer tool may compare a sliding window of the bitcode to a known bitcode snippet representing a call to the dummy function, or use an alternative pattern matching scheme to identify each instance of the dummy function call in the bitcode.

Whenever the optimizer tool detects a call to the dummy function by the allocation function (i.e., "Yes" in subprocess 240), it extracts and registers allocation information from the call. For example, the optimizer tool may extract data representing the parameters passed to the dummy function. These parameters may disclose the identifier of the memory pool from which memory is being allocated by the allocation function, the size of the data type for which memory is being allocated by the allocation function, and/or the name of the data type for which memory is being allocated by the allocation function. These parameters may be extracted from the bitcode and converted from bitcode back into source code. The converted parameters may then be stored as an allocation in a list of allocations. In an embodiment, only unique allocations are stored in the list. Thus, if an allocation already appears in the list, it may be discarded, instead of duplicated in the list. Alternatively, all allocations may be added to the list, and then duplicate allocations may be subsequently removed from the final list. As discussed elsewhere herein, a call graph may also be generated for each allocation. If a call to the dummy function is not detected in the current view of the bitcode (i.e., "No" in subprocess 240), the optimizer tool continues to scan the bitcode.

Once the entire bitcode has been scanned (i.e., "Yes" in subprocess 230), such that a complete list of unique allocations has been generated (and optionally, call graphs for one or more, including potentially all, of the allocations have been generated), the optimizer tool may automatically (e.g., without user involvement) or semi-automatically (e.g., with some user involvement) generate a header file in subprocess 260, which is recompiled with the source code in subprocess 270. In particular, the header file may be generated from the list of unique allocations that were registered in one or more iterations of subprocess 250. As discussed elsewhere herein, the header file may comprise definitions of one or more buckets (e.g., values for block size and block count) and definitions of one or more memory pools (e.g., a tuple of one or more references to the bucket definitions).

These definitions may be optimized for the particular allocations in the allocation list. For example, the optimizer tool may define block sizes for buckets in a particular memory pool to match or otherwise align with the sizes of data types for which data is allocated from that particular memory pool. Thus, if three different data types, having different sizes of 16 bytes, 32 bytes, and 1024 bytes, are all associated with a memory pool, the optimizer tool may define buckets having block sizes of 16 bytes, 32 bytes, and 1024 bytes, and define the memory pool to comprise a tuple of those three buckets. Alternatively, the optimizer tool could define buckets having block sizes of 16 bytes and 1024 bytes and define the memory pool to comprise those two buckets. In this case, each instantiation of a data type having the size of 32 bytes could utilize two blocks in the bucket having a block size of 16 bytes. In either case, the block sizes in the buckets of each memory pool are aligned with the sizes of the data types that utilize that memory pool.

It should be understood that there are a number of strategies for creating aligned buckets in this manner. The optimizer tool may be configured to utilize any one or more strategies for deriving bucket configurations from the registered allocations. In a straight-forward strategy, the optimizer tool generates a bucket for each unique data size in the list of allocations (i.e., a bucket with a block size equal to the data size), and then defines each memory pool to comprise buckets with block sizes matching all of the data sizes associated with that memory pool. In any case, the optimizer tool may derive the bucket definitions based on the size of the data types in the registered allocations, and may select the bucket definitions that define each memory pool based on the sizes of the data types used with that memory pool. In cases in which two memory pools utilize buckets with the same configuration, it should be understood that the optimizer tool can define the bucket once and utilize that single bucket definition in the definitions of both memory pools. In other words, bucket definitions can be reused across multiple memory pools.

3. Example Uses

Disclosed embodiments may be utilized to provide deterministic memory allocation in any software application in which deterministic memory allocation is necessary or desirable. The greatest benefit may be seen in real-time applications, and especially in real-time, safety-critical applications. Such applications include, without limitation, the control and/or safety systems for autonomous or semi-autonomous vehicles, robots, critical infrastructures (e.g., power plants, power grids, networks, etc.), rockets, satellites, medical devices, and/or the like.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of automatically generating a header file to define memory pools for deterministic memory allocation, the method comprising using at least one hardware processor to:
   receive bitcode representing compiled source code of an application, wherein the source code comprises an allocation function for allocating memory that calls a dummy function using one or more parameters; and, automatically,
      scan the bitcode to detect each call to the dummy function in the bitcode,
      for each detected call to the dummy function, extract the one or more parameters used in the detected call to the dummy function, and generate an allocation record from the extracted one or more parameters, and
      generate a header file based on the generated allocation records.

2. The method of claim 1, wherein the header file comprises a definition of one or more buckets and a definition of each of one or more memory pools, and wherein the definition of each of the one or more memory pools identifies at least one of the one or more buckets.

3. The method of claim 2, wherein the one or more parameters comprise a size of a data type, and wherein generating the header file comprises, for each unique size in the generated allocation records, generating at least one definition of a bucket comprising a block size that is aligned with that unique size.

4. The method of claim 3, wherein generating at least one definition of a bucket comprising a block size that is aligned with that unique size comprises generating a definition of a bucket comprising a block size that matches that unique size.

5. The method of claim 2, wherein the one or more parameters comprise an identifier of a memory pool, and wherein generating the header file comprises, for each unique identifier in the generated allocation records, generating a definition of a memory pool having that identifier.

6. The method of claim 2, wherein the one or more parameters comprises an identifier of a memory pool and a size of a data type to be stored in the memory pool, wherein each generated allocation record comprises the identifier of the memory pool and the size of the data type from the extracted one or more parameters, and wherein each definition of a memory pool comprises, for each unique size associated with the identifier of that memory pool in the generated allocation records, a reference to a definition of one of the one or more buckets whose block size is aligned with that unique size.

7. The method of claim 6, wherein the one or more parameters further comprise an identifier of the data type to be stored in the memory pool.

8. The method of claim 2, wherein the definition of each of the one or more memory pools comprises a tuple, wherein the tuple comprises one or more references, and wherein each of the one or more references identifies one of the one or more buckets.

9. The method of claim 1, wherein, in the bitcode, each instance of the allocation function is bound to a single memory pool, such that the allocation function cannot allocate from any memory pool other than the single memory pool.

10. The method of claim 1, wherein the allocation function is configured to:
    while the memory pool is undefined, allocate memory from an upstream resource available to the application; and,
    while the memory pool is defined, allocate memory from the memory pool.

11. The method of claim 1, wherein the source code is written in C++ programming language.

12. The method of claim 11, wherein the allocation function is a custom allocator according to an allocator model of the C++ programming language.

13. The method of claim 1, further comprising using the at least one hardware processor to, for each call to the allocation function in the bitcode, generate a call graph representing a path of function calls from an entry point of the application to the allocation function.

14. A non-transitory computer-readable medium having instructions stored therein, wherein the instructions, when executed by a processor, cause the processor to:
    receive bitcode representing compiled source code of an application, wherein the source code comprises an allocation function for allocating memory that calls a dummy function using one or more parameters; and, automatically,
       scan the bitcode to detect each call to the dummy function in the bitcode,
       for each detected call to the dummy function, extract the one or more parameters used in the detected call to the dummy function, and generate an allocation record from the extracted one or more parameters, and
       generate a header file based on the generated allocation records.

15. A system comprising:
    at least one hardware processor; and
    one or more software modules that are configured to, when executed by the at least one hardware processor,
       receive bitcode representing compiled source code of an application, wherein the source code comprises an allocation function for allocating memory that calls a dummy function using one or more parameters, and, automatically,
          scan the bitcode to detect each call to the dummy function in the bitcode,
          for each detected call to the dummy function, extract the one or more parameters used in the detected call to the dummy function, and generate an allocation record from the extracted one or more parameters, and
          generate a header file based on the generated allocation records.

* * * * *